3,399,581
BALL NUT AND SCREW ASSEMBLY
Peter Valenti, Whittier, and Paul V. Wysong, Jr., Northridge, Calif., assignors to Sargent Industries, Inc., a corporation of Delaware
Filed July 25, 1966, Ser. No. 567,503
10 Claims. (Cl. 74—424.8)

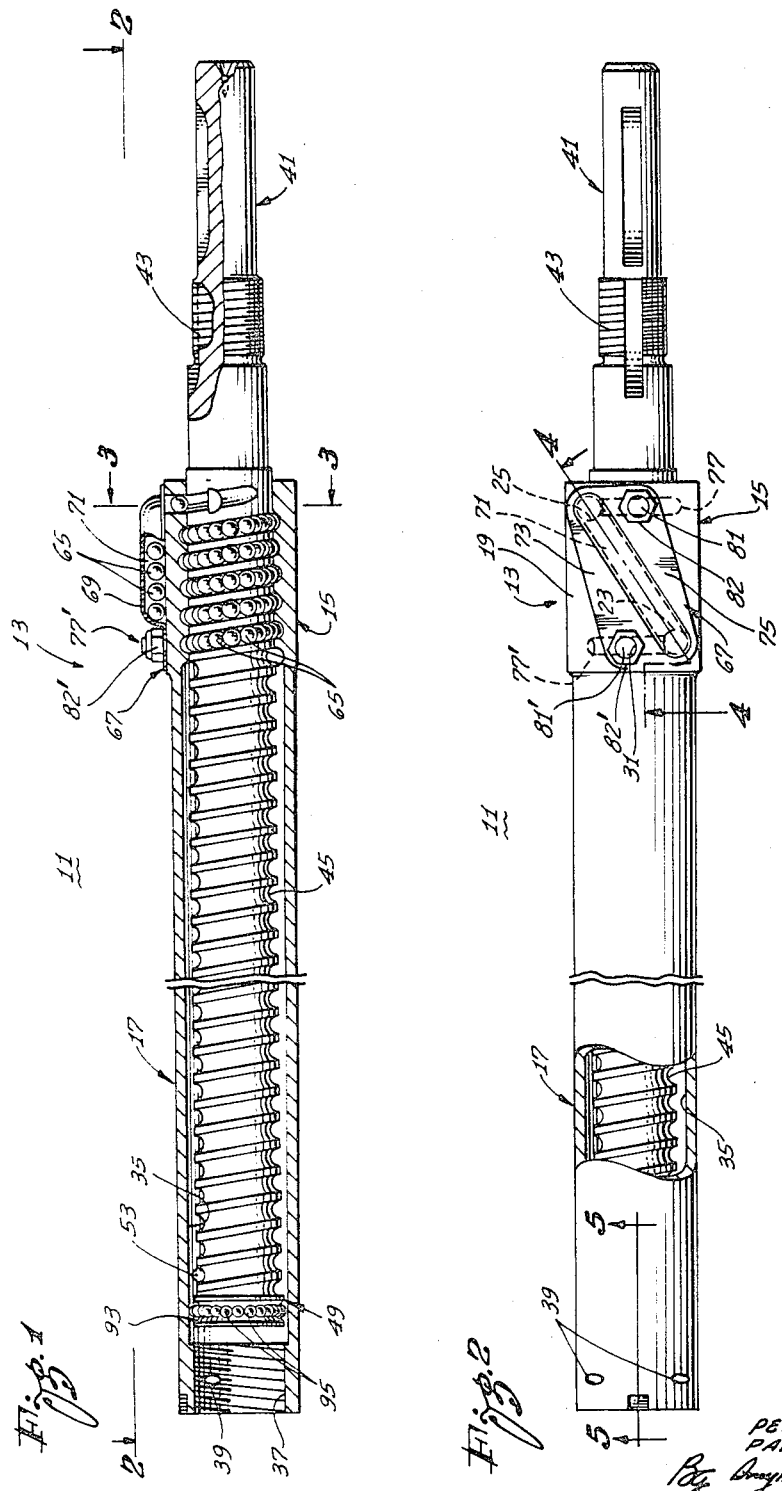

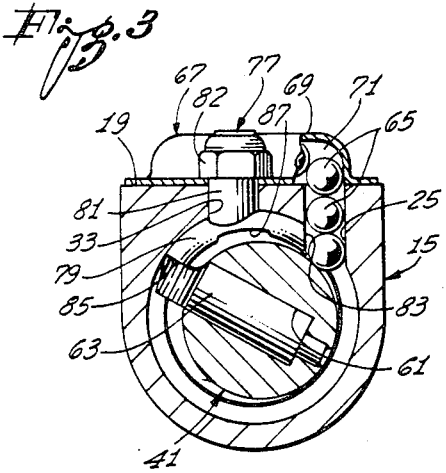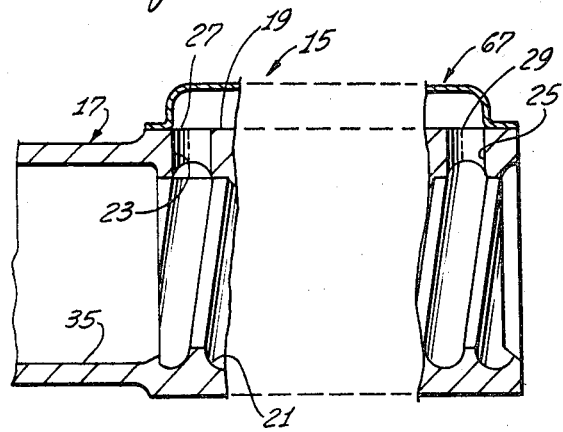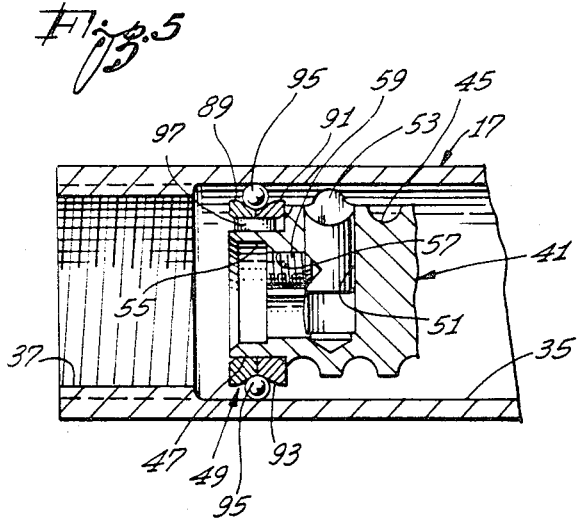

ABSTRACT OF THE DISCLOSURE

A ball nut and screw apparatus which includes an outer nut, a screw lying within the nut, and grooves on the confronting surfaces of the nut and screw which define a race for a plurality of balls. The balls circulate through the race and through a recirculating conduit. An abutment deflector member is secured to the nut and deflects the balls into the recirculating conduit and also serves as an abutment to limit relative rotation between the screw and nut.

---

This invention relates to a ball nut and screw assembly.

Ball nut and screw assemblies have been used for many years to convert rotary motion to linear motion or to convert linear motion to rotary motion with high efficiency. They are also useful in obtaining substantial speed reduction with high efficiency. One particular application for ball nut and screw assemblies is in the field of automotive steering.

A typical conventional ball nut and screw assembly includes an elongated tubular nut and a screw positioned within the nut. Grooves on the inner surface of the nut and the outer surface of the screw cooperate to form a race in which a plurality of balls are disposed. A recirculating conduit or passage, which is usually mounted exteriorly of the nut is provided for recirculating the balls from one area of the race to another area of the race. Thus, when the nut and screw are turned relative to each other, the balls and race form a high efficiency bearing that very substantially reduces the friction between the components of the device. The race and the recirculation passage form a closed loop through which the balls roll. In some instances, more than one of these loops of balls is provided.

To assure that the balls leave the race and enter the recirculation passage, some prior art devices provide a deflector adjacent the inlet of the recirculation passage for deflecting the balls from the race into the passage. The nut may be bored and the deflector secured in the bore. Still other prior art ball nut and screw assemblies have provided means for limiting the rotational movement of the screw relative to the nut which includes engageable stop members on the nut and screw, respectively. One of the stop members may be retained in an aperture through the nut. One problem with these prior art constructions is that they do not provide a simple and efficient deflector and abutment arrangement that will both deflect the balls into the recirculation passage and also limit the relative rotational movement of the nut and screw. It is, of course, very important that such relative rotational movement be limited to prevent separation of the nut and screw.

Another difficulty with prior art ball nut and screw assemblies relates to the recirculation passage. The typical recirculation passage for prior art ball nut and screw assemblies includes a tube which is secured to the exterior surface of the nut and is in communication with two ports in the nut which in turn communicate with the ends of the race. It is common practice to construct this tube in two separate semicircular halves, secure these two halves together, and then clamp the resulting tube by a relatively complicated clamping arrangement to the nut. The tube extends along the outer surface of the nut and is then bent at both ends through an arc of approximately 90 degrees so that it may enter or otherwise communicate with the port in the wall of the nut.

This construction is complicated, expensive and relatively difficult to assemble. Another problem is that the rounded corners on the tube require additional space. This is quite undesirable when the ball nut and screw assembly must be used, as it often is, in cramped and crowded surroundings. Secondly, use of the tube for a recirculation passage may cause problems with respect to dynamic balancing of the ball screw assembly.

Ball nut and screw assemblies are often subjected to moisture. This occurs, for example, when a ball nut and screw assembly is used on an exposed portion of an airplane, in which case, it may be exposed to mud, water, and other elements of nature. Another disadvantage of utilizing the conventional tube recirculation passage is that it is difficult to seal the tube to the nut in a manner which will prevent ingress of moisture into the assembly.

For some applications, it is necessary to make the nut and screw quite long. In these instances, it is frequently necessary to employ a guide bearing at the end of the ball screw assembly opposite the race. One such prior art guide bearing is, in effect, a second ball nut and screw assembly and includes the usual race and external recirculation passage. Although this device functions satisfactorily where the radial loads on the bearing are high, such construction is complicated, expensive and unnecessary when the radial loads are relatively low.

According to the present invention, all of the abovenoted difficulties and disadvantages of prior art ball nut and screw assemblies are eliminated. More particularly, the present invention provides a combined abutment deflector member which serves both to deflect the balls from the race into the recirculation passage and as an abutment for limiting the relative rotation between the nut and the screw. The recirculation passage of the ball screw assembly of this invention does not extend radially as far as the prior art tube recirculation passage and is cheaper and easier to construct. The ball nut and screw assembly of this invention is very compact and can be used in small spaces. Furthermore, the recirculation passage of this invention can be securely sealed to prevent ingress of moisture and permits better dynamic balancing of the assembly. Finally, the present invention provides a relatively inexpensive and easily constructed guide bearing that is particularly adapted for use with ball nut and screw assemblies which experience only slight radial loads. Thus, it is no longer necessary to use the relatively complicated and expensive ball nut and screw arrangement at both ends of the assembly.

The present invention may include a nut and screw having grooves thereon forming a race for a plurality of balls. A recirculating conduit is provided for interconnecting axially spaced areas of the race for circulating the balls between such two areas and the race.

One feature of this invention is a combined abutment deflector member which is secured to the nut adjacent one of the areas of the race. The abutment deflector member has a deflecting surface within the race adjacent such first area of the race for deflecting the balls into the recirculating conduit. The abutment deflector member also has an abutment face within the race spaced from the deflecting surface and engageable with a stop member on the screw for limiting the relative axial and rotational movement between the nut and screw. The abutment deflector member is a small integral device which efficiently performs the functions heretofore performed by individual elements.

More particularly, the abutment deflector member includes a leg portion lying within the race and defining the deflecting surface and the abutment face at opposite ends thereof. The abutment deflector member also has a projecting portion which extends through aperture means in the nut for securing the abutment deflector member to the nut.

The nut contains first and second spaced ports extending outwardly in a radial plane from the spaced area of the race. These ports terminate in spaced mouths at the outer surface of the nut. Another feature of this invention is the provision of a plate member or cap having a groove therein extending between such mouths to define the recirculating conduit. This plate is superior to the prior art tube in that it is formed from a single integral piece of metal and requires no special clamping device to secure it to the nut as it can be directly secured to the protruding portion of the abutment deflector member. The interface between the plate member and the outer surface of the nut can be easily sealed to permit use of the ball nut and screw assembly in applications in which it is exposed to substantial moisture. The plate member is also considerably more compact in that the protruding rounded corners of the prior art tube are eliminated. Use of the plate member also reduces the dynamic balancing problems heretofore associated with ball screw assemblies.

Another feature of this invention is the provision of a novel guide bearing for use in elongated ball nut and screw assemblies which receive only slight radial loads. This guide bearing includes an annular depression or race formed in one end of the screw and a smooth wall surface on the portion of the interior of the nut member that confronts such depression. A plurality of balls are provided in the depression and are prevented from falling out of the depression by their engagement with the smooth inner wall of the nut. The depression forms a closed loop for the balls. As the nut member and screw are turned relative to each other, the balls in the guide bearing will roll along the depression and may be caused to skid slightly in the axial direction.

The invention, both as to its organization and method of operation, together with further features and advantages thereof, may best be understood by reference to the following description taken in connection with the accompanying illustrative drawings in which:

FIG. 1 is a side elevational view partially in section showing a ball nut and screw assembly constructed in accordance with the teachings of this invention;

FIG. 2 is a top plan view taken along line 2—2 of FIG. 1 with a portion of the nut being broken away to expose the screw;

FIG. 3 is an enlarged sectional view taken along line 3—3 of FIG. 1 and showing the abutment deflector member;

FIG. 4 is an enlarged fragmentary sectional view of the nut member showing the ports through which the balls roll; and FIG. 5 is a enlarged fragmentary sectional view taken along line 5—5 of FIG. 2 and illustrating the guide bearing constructed in accordance with the teachings of this invention.

Referring to the drawings, and in particular to FIGS. 1–4 thereof, reference numeral 11 designates a ball nut and screw assembly constructed in accordance with the teachings of this invention. The ball nut and screw assembly 11 includes an elongated nut member or outer tubular member 13. The nut member 13 has a nut or tubular member 15 integral with a sleeve 17.

As best seen in FIG. 3, a portion of the outer surface of the nut 15 is semicylindrical and another portion of the outer surface thereof defines a generally planar platform 19. The inner surface of the nut 15 defines an axially and circumferentially extending groove 21 (FIG. 4). A pair of axially spaced ports 23 and 25 (FIG. 4) extend outwardly in a radial plane from opposite ends of the groove 21 and terminate in mouths 27 and 29, respectively, at the platform 19. Thus, the mouths 27 and 29 are spaced by a section of the platform 19. A pair of apertures 31 and 33 (FIGS. 2 and 3) extend outwardly from the groove 21 to the platform 19. The apertures 31 and 33 are spaced circumferentially a small distance from the ports 23 and 25, respectively. The ports 23 and 25 and the apertures 31 and 33 are all disposed directly over portions of the groove 21.

The sleeve 17 may be elongated as illustrated and preferably has a smooth inner cylindrical wall 35 (FIGS. 1, 2, and 4). The sleeve 17 terminates in a threaded socket 37. The sleeve 17 is axially aligned with the nut 15 and is preferably integral therewith. The socket 37 has three circumferentially spaced openings 39 formed therein.

An elongated screw 41 is provided within the nut member 13. The screw has a connector portion 43 and is provided with an axially and circumferentially extending groove 45 on the external surface thereof. The groove 45 preferably extends over a substantial portion of the length of the screw 41. The screw 41 has a reduced end portion 47 on which a guide bearing 49 is mounted. The guide bearing 49 is described in detail hereinbelow.

The screw 41 is formed with a generally radially extending bore 51 (FIG. 5) adjacent the guide bearing 49 and a generally radially extending stop member 53 is provided in the bore. The end portion 47 of the screw 41 is formed with a bore 55 and a threaded counterbore 57. A set screw 59 is received in the counterbore 57 to secure the stop member 53 in the bore 51.

Adjacent the other end of the screw 41, a radially extending passageway 61 is formed into which a second radially extending stop member 63 is secured.

The grooves 21 and 45 of the nut 15 and the screw 41, respectively, are arranged in confronting relationship and are appropriately sized to form a race intermediate the nut and screw. A plurality of balls 65 is disposed within the race for rolling movement. A plate member 67 having a groove 69 stamped therein forms a portion of a recirculating conduit 71 for the balls 65. The plate 67 also includes planar tabs 73 and 75 (FIG. 2) extending outwardly from the groove 69. The plate 67 is preferably an integral piece of metal.

As shown in FIGS. 1–3, the plate 67 is mounted on the platform 19 with the groove 69 extending between the mouths 27 and 29 of the ports 23 and 25, respectively. In extending between the mouths 27 and 29, the groove 69 overlies a portion of the platform 19. Thus, the groove 69 and such portion of the platform 19 define the recirculating conduit 71. The recirculating conduit 71 and the race define a closed loop for the ball 65.

It is apparent from FIGS. 1 and 3 that the groove 69 extends radially of the platform 19 a minimum distance. The corners of the groove 69 curve smoothly toward the ports 23 and 25 without necessitating spacing of the groove from the platform 19. Thus, the recirculating conduit 71 is made as compactly as is possible. Furthermore, the interface between the plate 67 and the platform 19 may be sealed by any suitable sealing agent (not shown). More particularly, the sealing agent may be sandwiched between the tabs 73 and 75 and the platform 19.

An integral abutment deflector member 77 (FIG. 3) is provided for deflecting the balls 65 into the ports 23 and 25 and for providing an abutment for limiting the rotational and axial movements of the nut 15 and the screw 41. The abutment deflector member 77 has an arcuate leg portion 79 disposed in the grooves 21 and 45 and a protruding portion or leg 81 integral with the leg portion 79 and extending generally radially thereof through the aperture 33 in the nut 15. The protruding portion 81 also extends through an opening in the tab 75 and the upper portion thereof is threaded to receive a nut 82. The nut 82 secures both the plate 67 and the abutment deflector member 77 to the nut 15.

The leg portion 79 terminates at one end in a deflecting surface 83 and at the other end in an abutment face 85. An indentation 87 is formed in the leg portion 79 generally opposite the protruding portion 81.

In the embodiment illustrated, a second abutment deflector member 77' is provided at the opposite end of the race and, to the extent that the components thereof are illustrated, corresponding prime reference characters are utilized to designate corresponding parts. The two abutment deflector members are identical.

The leg portion 79 (FIG. 3) preferably extends throughout a relatively short circumferential length of the race. In the embodiment shown, the leg portion 79 extends through less than 90 degrees of the race. Of course, the length of the leg portion 79 can be varied within prescribed limits to vary the position of the abutment face 85. The angle of the abutment face 85 relative to the longitudinal axis of the protruding portion 81 is preferably selected so that a substantial portion thereof will engage the corresponding face of the stop member 63. In the embodiment illustrated, such angle is between 60 and 65 degrees. The inclination of the deflecting surface 83 is appropriately selected so that it will effectively cam the balls 65 into the port 25. In the embodiment illustrated, the deflecting surface 83 is substantially flush with the wall of the port 25.

The guide bearing 49 is only required when the nut member 13 is elongated. The guide bearing 49 includes two ring members 89 and 91 having confronting inclined surfaces which define an annular peripheral depression or race 93. The race 93 is appropriately spaced from the wall 35 of the sleeve 17 to provide a space for a plurality of balls 95. The two ring members 89 and 91 are retained on the end portion 47 of the screw 41 by a key 97. When the screw 41 is rotated relative to the nut member 13, the balls 95 tend to roll circumferentially along the smooth wall 35 of the sleeve 17. The balls 95 may skid slightly, however, as the screw 41 moves axially of the sleeve 17. As such axial movement is relatively slow when compared with the rotational movement, this skidding does not substantially affect the efficiency of the ball screw assembly 11 so long as no substantial radial loads are applied to the guide bearing 49.

In the operation of the ball screw assembly 11, the screw 41 is rotated relative to the nut 15. This causes the balls 65 to roll in their race and into the recirculating conduit 71. The deflecting surface 83 deflects the balls 65 into the port 25. The recirculating conduit 71 and the race for the balls 65 form a closed loop through which the balls circulate. Simultaneously, the balls 95 roll in their race 93, which also forms a single continuous loop for the balls. Assuming that the relative rotation is moving the screw 41 to the right, as illustrated in FIG. 1, the stop member 53 will eventually engage the abutment face of the abutment deflector member 77' to thereby prevent further rotational and axial movement of the screw to the right. Similarly, when rotation of the screw 41 is in the opposite direction, the stop member 63 ultimately engages the abutment face 85 of the abutment deflector member 77 (FIG. 3) to halt such movement of the screw 41. Thus, relative movement of the screw 41 and the nut member 13 is limited in both directions.

It is apparent, therefore, that the construction described above eliminates many of the problems heretofore existing in prior art ball nut and screw assemblies. The above-described construction is much simpler than prior art structures, primarily because of the combined compact abutment deflector member 77 and because of the simplified plate 67 which forms the recirculating conduit 71. Also, no clamping devices are required for securing the plate 67 to the nut 15 as this function is accomplished by the nuts 82 and 82' which also secure the abutment deflector members 77 and 77' to the nut.

It will be apparent to those having ordinary skill in the art that one or more of the recirculating conduits 71 may be provided. Similarly, the guide bearing 49 will not be required when the nut member 13 is axially shortened. However, the guide bearing 49 is particularly advantageous when an elongated nut member is utilized and is not subjected to severe radial loading. Although the particular manner in which the stop member 53 is secured to the screw 41 can be varied, the one illustrated is preferred because it substantially facilitates assembly of the ball screw assembly 11.

Although an exemplary embodiment of the invention has been shown and described, it will be apparent to those having ordinary skill in the art that many changes, modifications and substitutions may be made by one having ordinary skill in the art without necessarily departing from the spirit and scope of this invention.

What is claimed is:

1. In a ball nut and screw apparatus, the combination of:

an outer tubular member having an outer surface;
an inner member disposed within said outer tubular member for movement axially with respect thereto;
a plurality of balls intermediate said members;
means on said members defining a race for said balls intermediate said members, said balls being mounted for rolling movement in said race, said race having first and second spaced areas thereon;
recirculating conduit means interconnecting said spaced areas of said race for recirculating said balls between said areas of said race, said conduit means having first and second openings at said first and second areas, respectively, of said race to receive the balls from said race;
an abutment deflector member secured to said outer tubular member adjacent said first area, said abutment deflector member having a deflecting surface in said race adjacent said first opening of said conduit means for deflecting said balls into said conduit means through said first opening thereof and an abutment face in said race spaced from said deflecting surface; and
stop means on said inner member engageable with said abutment face for limiting the relative axial movement between said outer tubular member and said inner member.

2. A combination as defined in claim 1 wherein aperture means are provided in said outer tubular member adjacent said first area of said race, said abutment deflector member including a first leg extending through said aperture means, a second leg integral with said first leg and extending within said race toward said first area of said race, and a third leg integral with said second leg and extending within said race generally away from said first area of said race and terminating in said abutment face, said second leg terminating in said abutment face, said second leg terminating in said deflecting surface, and means are provided for securing said first leg within said aperture means.

3. A combination as defined in claim 1 wherein said recirculating conduit means includes plate means secured to said outer surface of said tubular member, said plate means having a groove therein overlying a portion of said outer surface of said tubular member, said groove and said portion of said outer surface defining at least a portion of said recirculating conduit means.

4. A combination as defined in claim 3 wherein said abutment deflector member has a protruding portion extending through said outer tubular member and said plate means and means are provided on said protruding portion for securing said plate and said abutment deflector member to said outer tubular member.

5. In a ball nut and screw apparatus, the combination of:

a tubular nut having an inner surface defining an axially and circumferentially extending groove;
a screw lying within said nut and having an outer surface confronting said inner surface of said nut, said outer surface having an axially and circumferentially extending groove therein confronting said groove of said nut, said grooves of said nut and screw defining an axially and circumferentially extending race;

a plurality of balls mounted for rolling movement within said race, said grooves and said balls providing for relative axial and rotational movement between said nut and screw, said race having first and second axially spaced areas;

recirculating conduit means interconnecting said axially spaced areas of said race for recirculating said balls between said areas of said race, said recirculating conduit means having first and second openings at said first and second areas, respectively, of said race to receive said balls therefrom;

an integral abutment deflector member secured to said nut closely adjacent said first area of said race, said abutment deflector member having a deflecting surface within said race adjacent said first area of said race for deflecting said balls into said recirculating conduit means and an abutment face in said race spaced from said deflecting surface; and a stop member secured to said screw and protruding radially thereof, said stop member being engageable with said abutment face for limiting the relative axial and rotational movement between said nut and screw.

6. A combination as defined in claim 5 wherein said abutment deflector member includes a leg portion lying within said race and having opposed first and second ends defining said deflecting surface and said abutment face, respectively.

7. A combination as defined in claim 6 wherein said nut has aperture means extending from said race to the exterior of said nut and said abutment deflector member includes a projecting portion extending through said aperture means, and means are provided for securing said projecting portion of said abutment deflector member to said nut.

8. A combination as defined in claim 5 wherein a second abutment deflector member is secured to said nut adjacent said second area of said race, said second abutment deflector member having a deflecting surface in said race adjacent said second area thereof for deflecting said balls into said recirculating conduit means through said second opening and an abutment face in said race spaced from said deflecting face of said second abutment deflector member, and a second stop member is secured to said screw for engagement with said abutment face of said second abutment deflector member for limiting the relative axial and rotational movements between said nut and said screw.

9. In a ball nut and screw apparatus, the combination of:

a tubular nut having an inner surface, a first portion of which defines an axially and circumferentially extending groove and a second portion of which is relatively smooth;

a screw lying within said nut and having an outer surface confronting said inner surface of said nut, said outer surface having an axially and circumferentially extending groove therein confronting said axially and circumferentially extending groove of said nut, said grooves of said nut and screw defining an axially and circumferentially extending race;

a plurality of balls mounted for rolling movement within said race to permit relative axial and rotational movement between said nut and said screw;

said screw having a peripherally extending depression in the outer surface thereof confronting said second portion of said nut, said depression defining a closed loop surrounding said screw;

a plurality of ball members movably received in said depression and engageable with said second portion of said nut to permit low friction movement between said screw and said nut; and a ring member surrounding said screw and confronting said second portion of said nut, said ring member being secured to said screw for movement therewith and defining said depression, and said depression being annular.

10. In a ball nut and screw appaartus, the combination of:

an outer tubular member having an outer surface;

an inner member disposed within said outer tubular member;

a plurality of balls intermediate said outer tubular member and said inner member;

means for defining a path for said balls intermediate said members to permit relative axial movement between said outer tubular member and said inner member, said balls being mounted for rolling movement along said path;

said outer tubular member having first and second spaced ports extending from axially spaced areas of said path outwardly and terminating in spaced mouths at said outer surface of said outer tubular member, said mouths being spaced by a portion of said outer surface of said outer tubular member;

means including said portion of said outer surface of said outer tubular member for defining a recirculation passage for said balls, said recirculation passage extending between said spaced mouths and said ports; and said last-mentioned means including plate means overlying said outer surface of said outer tubular member, and sealing means provided for sealing said plate to said outer surface of said outer tubular member.

References Cited
UNITED STATES PATENTS

| | | | |
|---|---|---|---|
| 2,444,886 | 7/1948 | Vickers | 74—424.8 X |
| 2,505,131 | 4/1950 | Means | 74—459 |
| 2,636,397 | 4/1953 | Jacubenta | 74—459 |
| 2,925,744 | 2/1960 | Folkerts | 74—459 |
| 3,073,177 | 1/1963 | Grabowski | 74—424.8 X |
| 3,206,995 | 9/1965 | Bohnhoff | 74—459 |

FRED C. MATTERN, *Primary Examiner.*

LEONARD H. GERIN, *Assistant Examiner.*